Patented Apr. 22, 1947

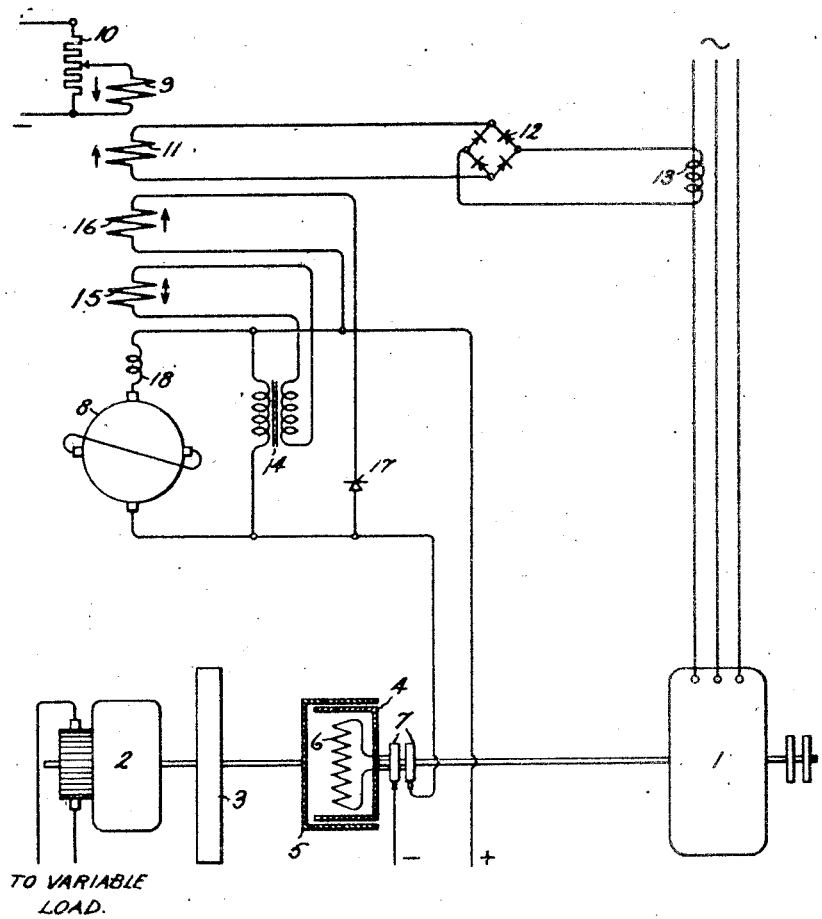

2,419,462

UNITED STATES PATENT OFFICE 2,419,462

CONTROL SYSTEM

Thomas H. Petch, Jr., and Hugh W. C. Liddiard, Rugby, England, assignors to General Electric Company, a corporation of New York Application August 17, 1945, Serial No. 611,188
In Great Britain November 16, 1944

8 Claims. (Cl. 172—284)

1

This invention relates to control systems and more particularly to motor-generator sets to which flywheels are fitted for power equalization purposes.

It is common in such equipments to provide for automatic regulation of the electrical slip of induction motors so as to obtain a constant power input to the driving motor. To this end a torque motor is provided which is made to develop a torque in proportion to the main current input, at constant voltage, to the motor driving the set. This torque is balanced against a fixed weight and lever mechanism which provides an opposing torque. When the current to the main motor exceeds a certain amount indicating an increased load demand the torque in the torque motor exceeds that opposed to it by the lever and weight mechanism, so that the torque motor rotates. In doing so it operates a mechanism, which inserts resistance in the secondary circuit of the main driving motor, which is usually an induction motor, so that the speed of this motor is reduced. The flywheel driven by the induction motor, due to its speed being reduced, gives up energy so providing the power required for the increased load while the current input to the main motor is maintained substantially constant.

The current demand is maintained substantially proportional to the opposing torque provided by the weight and lever mechanism on the torque motor. The value at which the current demand is fixed can be adjusted by altering the weight on the weight and lever mechanism. It is also to be noted that since the flywheel is coupled direct to the motor driving the motor generator set, the alteration in the speed of the flywheel also necessitates an alteration in the speed of the driving motor so that it is thus impossible to use a synchronous motor for this purpose.

The object of the present invention is to provide means for obtaining an alteration in the speed of the flywheel independently of the speed of the driving motor so that a synchronous driving motor may be used, if so desired, and also to provide a faster, more accurate and more readily adjustable slip regulating control than the usual lever and weight and torque motor mechanism.

The illustrated embodiment of the invention is characterized by a variable ratio coupling between the flywheel and the driving motor which permits a difference in the speeds of the flywheel and driving motor shafts. Preferably this coupling is of the type depending on an air-gap drive in a rotating magnetic system, the driving torque being provided either through eddy currents in the iron paths or through currents in specially provided copper circuits. The magnetic system is in the first place obtained from direct current windings on one part of the magnetic system. The direct current is obtained from a fixed source of supply but in series with the fixed source of supply there is a variable supply. This variable supply is obtained from a separately driven exciter, which may be of the amplidyne type, though this is not necessary. This exciter is provided with at least two field windings. One is connected to a manually adjustable source of direct current while the other is connected so as to receive a direct current proportional to the current supply to the main driving motor. These two fields of the exciter are arranged in opposition so that when the current in the main driving motor circuit corresponds to the setting of the manually adjustable field current there is virtually no resultant flux in the exciter field system. If, however, the current in the main driving motor circuit, due to an increase in generator load, exceeds the value of the setting, a resultant flux appears, a voltage is generated at the exciter armature terminals and this then bucks the fixed source of supply to the field of the coupling. The flux in the coupling is thus weakened allowing the driven portion of the coupling to drop in speed. This results in the flywheel giving up energy and as a consequence of this the current supply to the main driving motor is kept down to the required value. The current supply to the main driving motor is thus held substantially constant at a value dependent on the manually adjustable field current of the exciter. It will be appreciated that the manually adjustable field can be adjusted by a rheostat, which is a simpler adjustment than that required by the alteration of moving weights as with the older system involving a torque motor. It is also an adjustment which permits of remote control or of a continuously variable control should such be requirements in particular cases.

It will be appreciated of course that if the current in the main driving motor circuit falls below the value of the setting, due to a decrease of generator load, the resultant flux in the exciter field causes it then to buck to a less extent or to boost the fixed supply to the field of the coupling. The coupling field flux is thus increased causing a rise in the flywheel speed and in consequence a demand for a greater supply of current to the main driving motor for the purpose of accelerating the flywheel so that again substantially correct main current input is maintained.

An object of the invention is to provide a new and improved control system.

Another object of the invention is to provide a new and improved automatic regulating system for flywheel dynamo-electric machine sets.

A further object of the invention is to provide a new and improved amplidyne control system.

The invention will be better understood from the following description taken in connection with the accompanying drawing and its scope will be pointed out in the appended claims.

In the accompanying drawing, which diagrammatically illustrates one form of this invention, 1 is the motor, preferably a synchronous motor, driving the motor-generator set, 2 is the generator, 3 is the flywheel, while 4 is the driving half of an eddy current slip coupling and 5 the driven half. The slip coupling has a direct current field winding 6 and slip rings 7 to enable current to be brought to the field winding.

The slip rings 7 are connected in series with the armature 8 of an amplidyne excited to any suitable fixed source of direct current supply. The amplidyne exciter is separately driven by means not shown on the diagram.

The amplidyne has one main control field winding 9 connected through a potentiometer rheostat 10 to a fixed source of direct current supply. It has also a second main control field winding 11 connected through a bridge connected rectifier 12 to a current transformer 13, since the motor 1 is of the alternating current type, and may be an induction motor or synchronous type motor. If the main motor 1 were a direct current motor, then the rectifier 12 would not be needed and the current transformer 13 would be replaced by a shunt.

The potentiometer rheostat 10 may be set to any required value thus determining the constant current in the field 9. When the current supply to the motor 1 is such that the field 11, which is arranged to be in opposition to the field 9, is of equal value to the field 9 then there is no resultant flux in the amplidyne field and its armature will generate no volts. The current in the field 6 of the slip coupling is then determined solely by the source of separate supply. Provided the current to the motor 1 remains constant the speed of the flywheel 3 remains constant.

If the current to the motor 1 rises only very slightly above the prescribed value, field 11 exceeds field 9 and there is resultant flux in the amplidyne which causes it to generate appreciable volts to buck the fixed source of supply to the field 6. The slip coupling field is thus weakened, the flywheel 3 drops in speed and gives up energy to the generator 2 thereby driving the generator to provide the bulk of the additional current required by the load on the generator 2. The current supply to the motor 1 is thus maintained at substantially the prescribed value in spite of an increase in the load on the generator 2. For a reduction in the load on the generator 2 the opposite effect takes place. Either the amplidyne 8 will provide less bucking effect or else it will actually boost the separate supply to the field 6. This causes a rise in the speed of the flywheel 3 and requires current in the supply to the motor 1 for the purpose of accelerating the flywheel.

It will be understood that the motor 1 can be run at constant speed and can therefore be a synchronous motor if desired.

A system of this type may require anti-hunt means to prevent undesirable oscillations. One convenient method of providing for this is to connect the primary of a transformer 14 across the armature of the amplidyne while its secondary is connected to a third field winding 15 on the amplidyne. There are a number of other devices which can be connected so as in the same way to be dependent on the rate of change of the amplidyne volts. Such are well known to the art. Any of them may be used in place of the transformer 14.

In some cases it may be desirable to prevent the amplidyne 8 from boosting to any appreciable extent the supply to the field 6. This can be achieved by providing the amplidyne with a fourth field 16 connected through a rectifier 17 to the amplidyne armature terminals. Now only if the amplidyne tends to boost will current flow through the field 16. When this happens the field 16, being connected to oppose the field 9, can be so proportioned that with only a slight rise of volts in the amplidyne armature terminals in the boosting sense it will wipe out the effect of the field 9 and so will substantially prevent any appreciable boosting volts from appearing. The compensating winding for the amplidyne is indicated at 18.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In combination, a dynamo-electric generator, a flywheel rigidly coupled to the generator shaft, a dynamo-electric motor, an electrically controlled mechanical slip coupling between the generator and motor device, and means responsive to the electric power delivered to said motor for controlling said slip coupling so as automatically to maintain substantially constant motor power with wide variations in generator load.

2. In combination, a dynamo-electric generator, a flywheel rigidly coupled to the generator shaft, a dynamo-electric motor, an electrically controlled variable ratio drive coupling between the generator and motor device, an amplidyne for electrically energizing said variable ratio drive to control the ratio thereof, and means responsive to the electric power delivered to said motor for varying the output of said amplidyne to control the ratio of said coupling so as automatically to maintain substantially constant motor power with wide variations in generator load.

3. In combination, a synchronous motor, a flywheel equipped electric generator, an electrically controlled mechanical slip coupling between said motor and generator, and means responsive to the electric power delivered to said motor for controlling the electrical energization of said slip coupling so as automatically to keep the motor power constant with variations in generator load.

4. In combination, a synchronous motor, a flywheel equipped electric generator, a variable ratio coupling between said motor and generator, and means responsive to the electric power delivered to said motor for controlling the ratio of said coupling so as automatically to keep the motor power constant with variations in generator load.

5. In combination, a synchronous motor, a flywheel equipped electric generator, an electrically controlled mechanical slip coupling between said motor and generator, an amplidyne for controlling the electrical energization of said slip coupling, and means responsive to the electric power delivered to said motor for controlling the excitation of said amplidyne so as automatically to keep the motor power substantially constant with variations in generator load.

6. In combination, an electric power circuit, a main dynamo-electric machine connected to said circuit, a flywheel coupled to said machine, a variable load connected to said flywheel, an amplidyne connected to control the electric power flow between said circuit and machine, and means responsive to said power flow for controlling said amplidyne so as automatically to maintain said power flow substantially constant, irrespective of variations in said connected load.

7. In combination, a controlled electroresponsive device, a plurality of sources of control potential connected to said device, one of said sources being an amplidyne, means for controlling the potential of said amplidyne, and means effectively preventing said amplidyne from reversing its polarity.

8. In an automatic control system comprising, in combination, an amplidyne, a pair of opposed main control field windings on said amplidyne, a source of constant current for one of said control field windings, and an auxiliary control field winding on said amplidyne connected across the output terminals of said amplidyne through a unidirectional conducting device which prevents energization of said auxiliary control field winding except when the polarity of said amplidyne is such as to cause said auxiliary field winding to oppose the main control field winding connected to the source of constant current.

THOMAS H. PETCH, Jr.
HUGH W. C. LIDDIARD.

REFERENCES CITED

The following references are of record in the file of this patent:

UNITED STATES PATENTS

| Number | Name | Date |
|---|---|---|
| 912,074 | Clark | Feb. 9, 1909 |
| 1,305,612 | Davies | June 3, 1919 |
| 2,294,775 | Edwards | Sept. 1, 1942 |